US008622316B2

(12) United States Patent
Haeberer et al.

(10) Patent No.: US 8,622,316 B2
(45) Date of Patent: Jan. 7, 2014

(54) SCR-INJECTION UNIT

(75) Inventors: Rainer Haeberer, Bretten (DE);
Matthias Horn, Freiberg (DE);
Ulf-Peter Schmeling, Benningen (DE)

(73) Assignee: Robert Bosch GmbH, Stuttgart (DE)

( * ) Notice: Subject to any disclaimer, the term of this patent is extended or adjusted under 35 U.S.C. 154(b) by 698 days.

(21) Appl. No.: 12/521,351

(22) PCT Filed: Nov. 16, 2007

(86) PCT No.: PCT/EP2007/062440
§ 371 (c)(1),
(2), (4) Date: Jun. 26, 2009

(87) PCT Pub. No.: WO2008/080695
PCT Pub. Date: Jul. 10, 2008

(65) Prior Publication Data
US 2010/0320285 A1    Dec. 23, 2010

(30) Foreign Application Priority Data

Dec. 28, 2006 (DE) .......................... 10 2006 061 730

(51) Int. Cl.
*B05B 15/00* (2006.01)
*F02M 61/00* (2006.01)
*F02M 63/00* (2006.01)
*F02M 39/00* (2006.01)

(52) U.S. Cl.
USPC ......... 239/132.3; 239/533.2; 60/286; 60/293; 60/295; 60/298

(58) Field of Classification Search
USPC ........... 60/286, 293, 301, 303, 307, 323, 295, 60/298; 239/132.3, 132, 585.1, 533.2, 239/533.12, 533.11, 585.2, 133
See application file for complete search history.

(56) References Cited

U.S. PATENT DOCUMENTS

| 5,522,218 | A  | * | 6/1996  | Lane et al. ...................... 60/274 |
| 6,192,677 | B1 |   | 2/2001  | Tost |
| 6,513,323 | B1 | * | 2/2003  | Weigl et al. ..................... 60/286 |
| 7,603,849 | B2 | * | 10/2009 | Hanitzsch et al. .............. 60/286 |
| 2005/0235632 | A1 | * | 10/2005 | Tarabulski et al. .............. 60/282 |
| 2006/0107655 | A1 |   | 5/2006  | Hanitzsch et al. |

FOREIGN PATENT DOCUMENTS

| DE | 19856366 C1 | 4/2000 |
| EP | 1662108 A1 | 5/2006 |
| JP | 996212 A | 4/1997 |
| JP | 2002543337 A | 12/2002 |
| JP | 200383041 A | 3/2003 |
| JP | 2005108913 A | 4/2005 |

* cited by examiner

*Primary Examiner* — Justin Jonaitis
(74) *Attorney, Agent, or Firm* — Michael Best & Friedrich LLP

(57) ABSTRACT

An SCR-injection unit includes an injector, a sleeve element for fixing the injector to a flange of an exhaust gas pipe, and a cooling body. According to the invention, the sleeve element has an elongated thin-walled connecting section, one axial end of which is indirectly connected to the flange of the exhaust gas pipe and the other axial end of which is indirectly connected to a supporting structure for the injector.

21 Claims, 3 Drawing Sheets

SCR-INJECTION UNIT

CROSS-REFERENCE TO RELATED APPLICATION

This application is a 35 USC 371 application of PCT/EP 2007/062440 filed on Nov. 16, 2007.

BACKGROUND OF THE INVENTION

1. Field of the Invention

The invention relates to an SCR injection.

2. Description of the Prior Art

It is known, for example from DE 103 24 482 A1, that the nitrogen oxide content in the exhaust of an internal combustion engine can be reduced by means of a selective catalytic reduction (SCR). To accomplish this, a substance with an immediate reducing action such as ammonia or a precursor is supplied into the exhaust and releases reducing substances once it comes into contact with the exhaust. For example, a urea/water solution can be used as a precursor. Ammonia is converted into molecular nitrogen and water in the selective catalytic reduction with nitrogen monoxide and nitrogen dioxide. The selective catalytic reduction takes place in an SCR catalytic converter.

The urea/water solution, for example, is introduced into the exhaust by means of an SCR injection unit. This injection unit in turn includes an injector and a fastening device that serves to fasten the injector to a flange of an exhaust pipe. In this way, the injector injects the urea/water solution directly into the exhaust pipe, upstream of the SCR catalytic converter.

OBJECT AND ADVANTAGES OF THE INVENTION

In order to be able to introduce the reducing agent into the exhaust in an optimal fashion, the injector must be positioned as close as possible to the hot exhaust pipe. For reasons of component strength, the aging of the reducing agent, and the corrosion tendencies connected with it, though, the temperature of the injector must not exceed a certain level during operation. The object of the present invention is to create an SCR injection unit that has a low temperature during operation of the injector, can simultaneously be manufactured in a simple and inexpensive fashion, and is rugged in design.

This object is attained with an SCR injection unit. Advantageous modifications of the invention are disclosed in the dependent claims. Defining characteristics that are important to the invention are also explained in the description below and shown in the accompanying drawings. These defining characteristics can also be important for the invention in entirely different combinations, without requiring explicit reference to them.

The present invention is based on the realization that during operation, the injector is heated not only by the direct contact of its tip with the hot exhaust, but also through the conduction of heat via the support structure fastened to the exhaust pipe. The SCR injection unit according to the present invention counteracts this by virtue of the fact that the conduction of heat from the exhaust pipe to the injector is significantly reduced or even entirely eliminated. This is accomplished by means of two measures. In the first measure on the one hand, the conduction of heat via the sleeve element is reduced by virtue of its being equipped with an elongated, thin-wall connecting section that constitutes a sort of "heat flow throttle" through which the heat must flow. The second measure is the fact that the support structure for the injector is nonpositively connected to only the axial end of the sleeve element oriented away from the exhaust pipe. As a result, the flow of heat traveling through the sleeve element is kept away from the support structure for the injector.

As a result, the reducing agent in the injector is subjected to less aging and the injector has an increased ruggedness in terms of temperature strain. Since the reducing agent in the injector transitions into the vapor phase at a temperature greater than 140 to 160° C., depending on the system pressure, the improved heat dissipation makes it possible to avoid boiling in the injector and a resulting incorrect metering. This is all achieved through simple structural measures that reduce the complexity of production.

This is particularly true if the sleeve element is composed of metal, in particular is manufactured as a formed part. In addition, a sleeve element of this kind has an improved service life since a metal part has only a slight tendency to crack in comparison to a ceramic part.

The flow of heat via the sleeve element to the cooling body is further reduced if a thermal insulation is provided between the cooling body and the connecting section.

The length/thickness ratio of the connecting segment is preferably greater than 3 since all by itself, this feature produces a good "heat throttle". With a ratio of greater than 10, the throttle action is improved even more significantly and with a ratio of greater than 20, the component can already be referred to as a "heat flow block". Because the flow of heat is throttled via the sleeve element, the cooling body can be a passive cooling body; it is not necessary to use a cooling fluid, for example an aqueous urea solution, rendering it unnecessary to provide the accompanying cooling conduits in the support structure.

In an advantageous structural embodiment of the SCR injection unit, the region of the sleeve element oriented toward the flange of the exhaust pipe includes a shield section that extends radially inward toward the tip of the injector, leaving a narrow gap between its free edge and the injector. In this way, the sleeve element performs a double function: on the one hand, it serves to support the injector and on the other hand, it protects the injector from an intense thermal contact with the exhaust flowing in the exhaust pipe, thus preventing an undesirable heating of the injector. A conduction of heat from the injector into the shield section and therefore into the sleeve element is avoided by means of the gap.

The shield section can have an axially extending collar formed onto it, which transitions into a counterpart flange of the exhaust pipe. This forms a tubular base by means of which the sleeve element can be fastened to the flange of the exhaust pipe in a simple, secure fashion.

The connecting section can in turn be formed onto the shield section in the region of the collar. Such a part is simple to manufacture. In addition, the collar all by itself can function as a heat throttle, already resulting in a reduced heat quantity being introduced into the connecting section.

According to one specific structural embodiment of the sleeve element, the sleeve element includes a first region extending radially outward from the shield section, a second region adjoining the first and extending axially away from the exhaust pipe, and a radially extending third region adjoining the second. This gives the sleeve element a C-shaped or alternatively Z-shaped cross section, which on the one hand, has an advantageous strength and on the other hand, is able to provide the connecting section with the length required to form a heat throttle, without the sleeve element having particularly large dimensions.

In lieu of the above-mentioned collar, at least some areas of the above-mentioned first region of the connecting section can be embodied in the form of a counterpart flange to the flange of the exhaust pipe. The sleeve element is thus simpler and less expensive to manufacture.

A particularly favorable thermal coupling is achieved if the cooling body is formed onto the sleeve element, particularly in its third region.

In another proposal, a heat-conducting body is supported in the press fit between the cooling body and the injector, particularly in the region of the tip of the injector. Such a heat-conducting body can include a graphite element, for example, and the support in the press fit on the one hand produces a good thermal contact and thus a favorable heat dissipation from the injector to the cooling body and on the other hand, this provides a particularly simple support for the injector. The heat-conducting body is thus part of the support structure for the injector.

The support structure for the injector can also include a wall section that extends approximately parallel to, spaced apart from, and radially inside the connecting section in some regions and that is nonpositively attached to the end of the connecting section remote from the flange of the exhaust pipe. All by itself, this arrangement achieves a good thermal decoupling of the support structure from the sleeve element, thus reducing or even entirely eliminating the introduction of heat from the sleeve element into the injector. This is true to an even greater degree if the nonpositive connection between the connecting section and the support structure includes a thermal insulation.

To simply fasten the injector to the support structure, a heat-conducting body can be supported in the press fit between the support structure and the injector. This can in turn have a direct thermal connection to the cooling body in order to be able to dissipate the heat from the tip of the injector as effectively as possible. The same is true of the support structure.

It is easier to attach the SCR injection unit to the exhaust pipe if the sleeve element has a circumferential shoulder that largely protrudes outward in a region adjacent to the flange of the exhaust pipe and in the installed position, is engaged by at least one V-bracket for attaching the sleeve element to the flange of the exhaust pipe.

A thermal insulation element situated between the flange of the exhaust pipe and the sleeve element serves to reduce the introduction of heat from the former into the latter.

It is particularly advantageous if a region of the connecting section forms a heat exchanger with the ambient air. This further reduces the flow of heat that could travel to the injector via the sleeve element.

BRIEF DESCRIPTION OF THE DRAWINGS

Exemplary embodiments of the invention will be explained in greater detail below in conjunction with the accompanying drawings.

DESCRIPTION OF THE PREFERRED EMBODIMENTS

Figure 1:
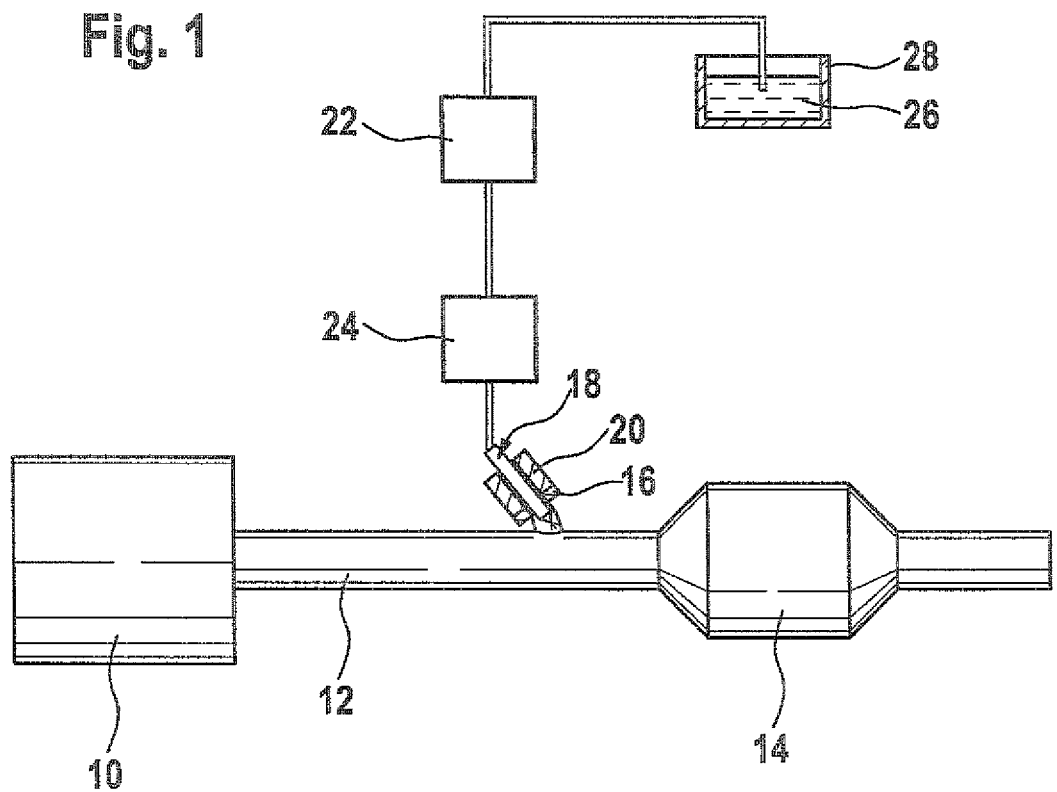
FIG. 1 is a schematic depiction of an internal combustion engine equipped with an SCR injection unit.

An internal combustion engine is symbolically depicted in FIG. 1 and labeled as a whole with the reference numeral 10. Hot exhaust is supplied via an exhaust pipe 12 to an SCR catalytic converter 14. Upstream of this, a flange 16 is formed onto the exhaust pipe 12, to which an SCR injection unit 18 with a sleeve element 20 is fastened. A urea/water solution 26 stored in a tank 28 is supplied to the SCR injection unit 18 by means of a pump 22 and a valve device 24.

During operation of the internal combustion engine 10, if the SCR injection unit 18 injects the urea/water solution 26 in the form of a fine spray into the exhaust flowing in the exhaust pipe 12, a reaction of the urea with the water produces ammonia, which is then converted in the SCR catalytic converter 14 into molecular nitrogen and water through selective catalytic reduction with nitrogen monoxide and nitrogen dioxide.

A first embodiment of the SCR injection unit 18 will now be explained in greater detail with reference to FIG. 2: the SCR injection unit 18 includes an injector 30 whose tip 31 has a nozzle (not visible) that atomizes the urea/water solution 26 into a fine spray. The injector 30 is fastened to the flange 16 of the exhaust pipe 12, as mentioned above, by means of the sleeve element 20, which in turn has a thin-walled connecting section 34 that is indirectly connected in a nonpositive fashion to the flange 16 of the exhaust pipe 12 at one axial end and at the other axial end, is indirectly connected in a nonpositive fashion to a support structure 36 for the injector 30. The type of nonpositive connection, however, is not shown in detail in FIG. 2; it is conceivable to use a press fit, clamps, crimping, etc.

In its region oriented toward the flange 16 of the exhaust pipe 12, the sleeve element 20 has a shield section 38 extending radially inward toward the tip 31 of the injector 30. During operation, this shield section 38 functions as a "thermal shield" that prevents the upper part of the injector 30 and the support structure 36, for example, as well as other components described below from coming into contact with the hot exhaust. Between the free, protruding edge (unnumbered) of the shield section 38 and the tip 31 of the injector 30, there is a narrow gap 40 that prevents a direct thermal contact between the shield section 38 and the injector 30 and prevents a vibration-induced wear on the contact points.

The connecting section 34 includes a first region 42 extending radially outward from the shield section 38, a second region 44 adjoining the first and extending on the whole axially away from the exhaust pipe 12, and a third region 46 adjoining the second and in turn extending radially outward. In the embodiment shown in FIG. 2, the wall of the sleeve element 20 has a cross-sectional geometry that is approximately Z-shaped on the whole. The actual connecting section 34 of the sleeve element 20 according to FIG. 2 is constituted by the second region 44. The ratio of the length L to the thickness D of the connecting section 34 is approximately 20.

The first region 42 of the sleeve element 20 situated between the shield section 38 and the connecting section 34 is embodied in the form of a counterpart flange to the flange 16 of the exhaust pipe 12. A thermal insulation element 48 is situated between the first region 42 and the flange 16. The insulation element is supported between a shoulder 50 and the shield section 38. The shoulder 50 protrudes radially outward from the connecting section 34 of the sleeve element 20 and then toward the flange 16 of the exhaust pipe 12, with a first section 50a extending approximately horizontally in FIG. 2, a second section 50b adjoining the first and extending downward at an angle of approximately 45°, and a third section 50c extending approximately perpendicular to the flange 16 of the exhaust pipe 12 in FIG. 2. In the installed position shown in FIG. 2, a V-bracket 52 embraces the shoulder 50, thus fastening the sleeve element 20 to the flange 16 of the exhaust pipe 12. Due to the thermal insulation element 48, a flow of heat from the flange 16 into the sleeve element 20 is essentially possible only via the V-bracket 52 and the shoulder 50. The flow of heat is correspondingly low since these components have only a small cross section.

The support structure 36 for the injector 30 is likewise embodied as sleeve-shaped, with a sleeve wall, which, like the sleeve element 20, has a cross-sectional geometry that is approximately Z-shaped on the whole. It includes two wall sections 54 and 56 extending approximately parallel to and spaced apart from the connecting section 34 and the first region 42 of the sleeve element 20. The two wall sections 54 and 56 also extend radially inside the connecting section 34. The wall section 54 is nonpositively connected to the third region 46 of the sleeve element 20 by means of a wall section 58 extending parallel to the third region 46 of the sleeve element 20, as explained above. The support structure 36, however, is thermally decoupled from the sleeve element 20 by means of a thermal insulation element 60.

Between the axially extending wall section 54 of the support structure 36 and the injector 30, an annular heat-conducting body 62 is supported in the press fit. In this way, the injector 30 is also at least indirectly supported on the support structure 36. The SCR injection unit 18 also has a passive cooling body 64 that is likewise largely embodied in the form of a ring and is provided with cooling fins 66 on the radial outside. The cooling body 64 has a slightly larger diameter than the axial wall section 54 of the support structure 36. The end surface of the cooling body 64 oriented toward the support structure 36 therefore has an extension 68 with a reduced diameter that protrudes slightly into the support structure 36 and rests directly flush against the upper end surface of the heat-conducting body 62 in FIG. 2. In this way, the heat-conducting body 62 and the cooling body 64 have a direct thermal connection to each other. The diameter and axial length of the extension, however, are sized so that the cooling body 64 also has a direct thermal connection to the support structure 36, particularly with the upper end region of the axial wall section 54 and the radially inner region of the wall section 58.

Figure 2:
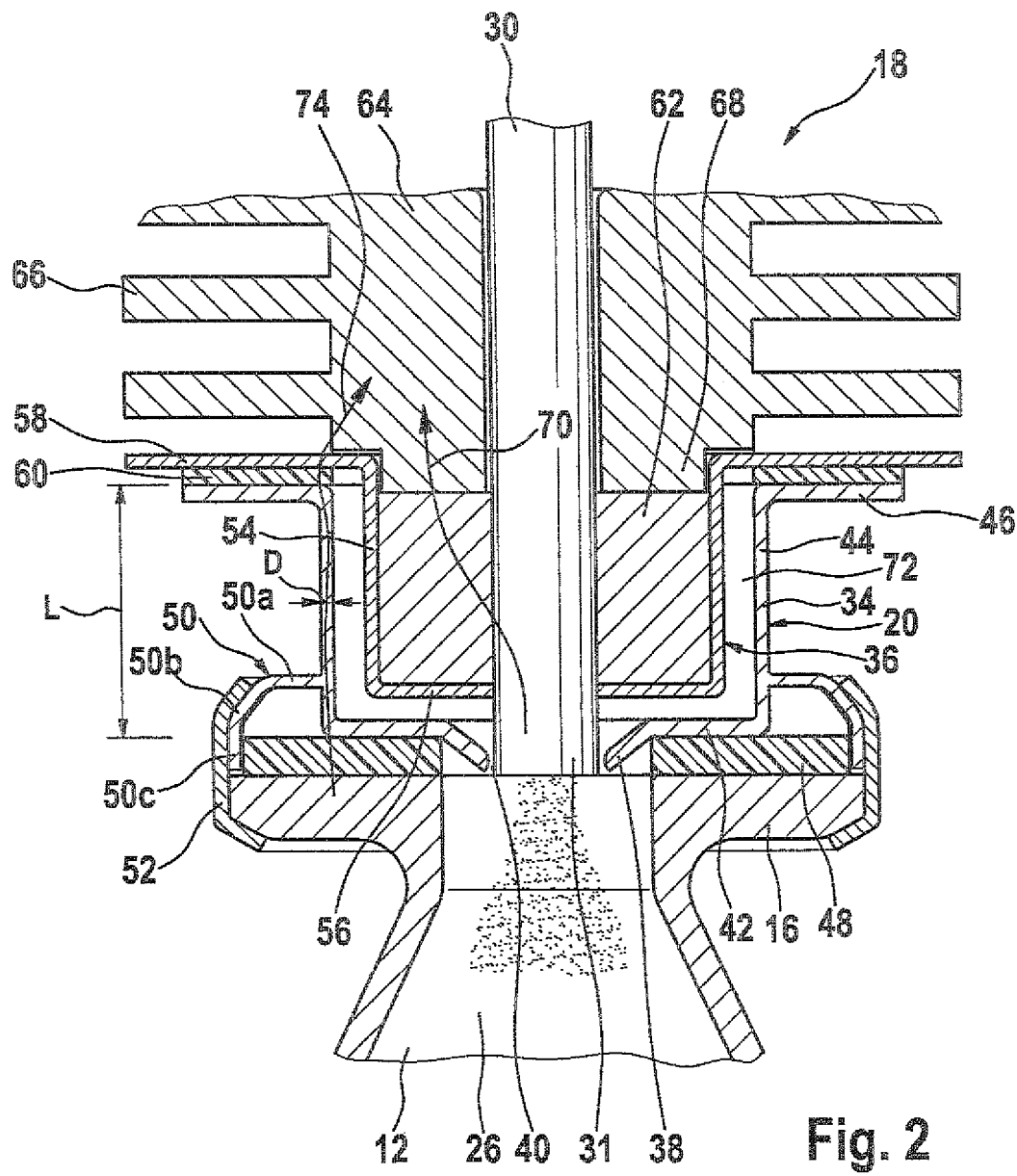
FIG. 2 is a partial section through a first embodiment of a region of the SCR injection unit from FIG. 1.

FIG. 2 shows that the heat-conducting body 62 is situated very close to the tip 31 of the injector 30. In this way, the heat-conducting body 62 absorbs the flow of heat from the injector 30 that has permeated into the injector's tip 31 and carries it away to the cooling body 64. The corresponding flow of heat is indicated by an arrow 70 in FIG. 2. It is also clear from FIG. 2 that in large areas between the support structure 36 and the sleeve element 20, there is a thermally insulating air gap 72, which reduces or even completely eliminates a heat exchange between the support structure 36 and the sleeve element 20. The conduction of heat via the sleeve element 20 is also minimal: this is due on the one hand to the thermal insulation provided by the thermal insulation element 48, but on the other hand, is also due to the embodiment of the connecting section 34, which functions as a "thermal throttle," in the form of an elongated, thin-walled part that additionally constitutes a heat exchanger with the ambient air. In addition, the thermal insulation element 60 prevents a heat exchange between the sleeve element 20 on the one hand and the cooling body 64 and support structure 36 on the other. Due to all of these measures, the flow of heat indicated by an arrow 74 in FIG. 2 from the flange 16 via the sleeve element 20, into the support structure 36 and the cooling body 64 is extremely slight.

An alternative embodiment of the SCR injection unit 18 will be described below in conjunction with FIG. 3. Those elements and regions that have functions equivalent to elements and regions that have already been described have been provided with the same reference numerals and will not be further explained.

Figure 3:
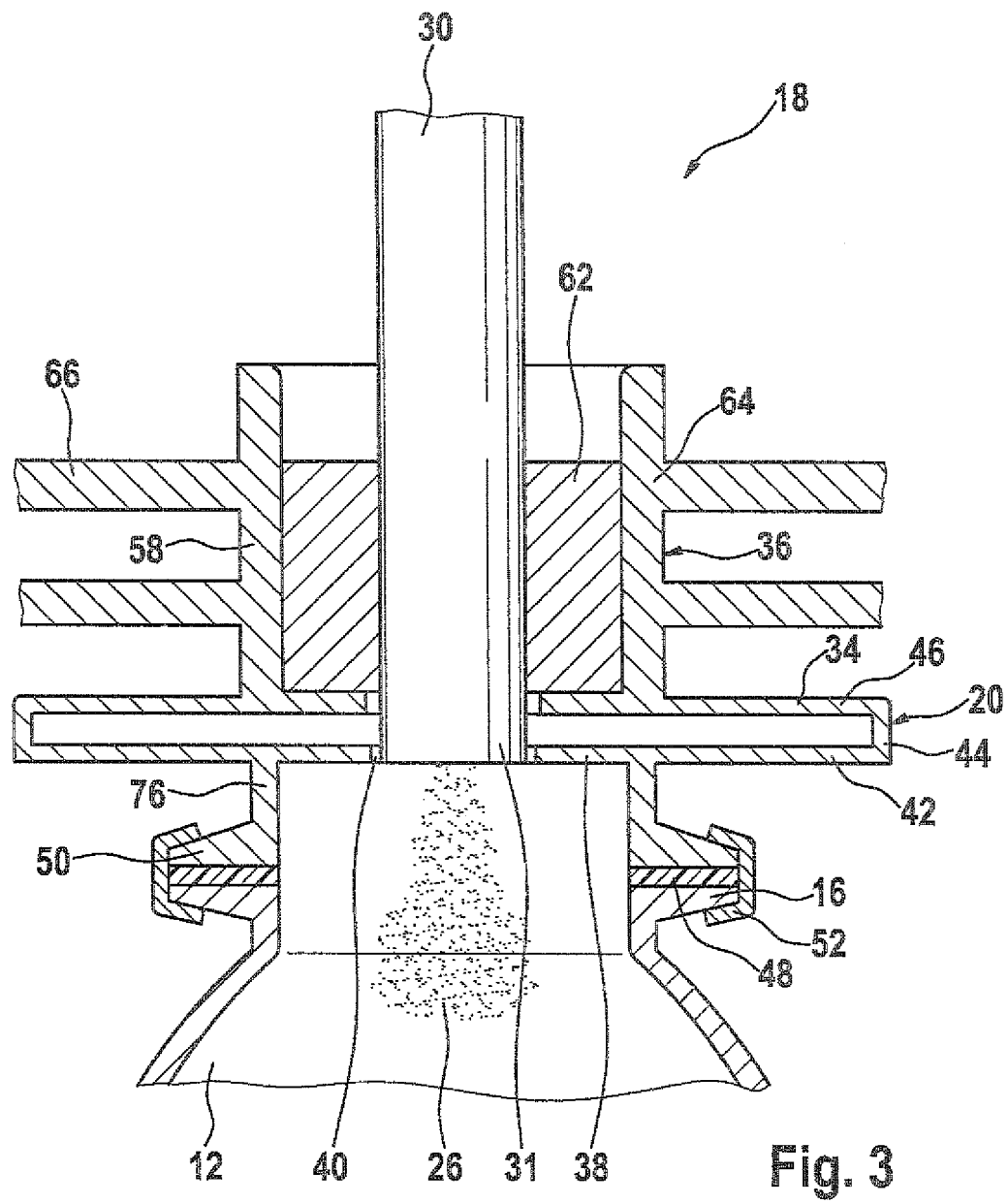
FIG. 3 is a depiction similar to FIG. 2 of a second embodiment.

A first difference relates to the connection of the sleeve element 20 to the flange 16 of the exhaust pipe 12: by contrast with the embodiment shown in FIG. 2, in the SCR injection unit 18 shown in FIG. 3, the shield section 38 has a collar 76 formed onto it, which extends axially toward the flange 16 and transitions into a radially outward-extending counterpart flange 50 to the flange 16 of the exhaust pipe 12. This counterpart flange once again constitutes a shoulder 50 that is embraced by the V-bracket 52, thus permitting the sleeve element 20 to be affixed to the flange 16 of the exhaust pipe 12.

In the embodiment shown in FIG. 3, the cross-sectional geometry of the sleeve element 20 is not Z-shaped, but rather C-shaped since the third region 46 extends radially inward. In addition, the support structure 36 and cooling body 64 are not embodied as separate parts, but are instead integrally joined to the sleeve element 20. The support structure 36 is actually constituted by the cooling body 64: to be precise, this cooling body simply has a ring 58 extending axially upward in FIG. 3 from the third region 46 of the sleeve element 20, with radially outer cooling fins 66 formed onto it. The heat-conducting body 62 is supported in the press fit between the injector 30 on the one hand and the cooling body 64 and ring 58 of the support structure 36 on the other.

In the embodiment shown in FIG. 3, the connecting section 34 is composed of all three sections 42, 44, and 46. Since the second region 44 has only a short length, the sleeve element 20 is very short in the axial direction, which in turn permits the heat-conducting body 62 to be placed very close to the tip 31 of the injector 30.

The foregoing relates to the preferred exemplary embodiments of the invention, it being understood that other variants and embodiments thereof are possible within the spirit and scope of the invention, the latter being defined by the appended claims.

The invention claimed is:

1. An SCR injection unit, comprising:
   an injector;
   a support structure for the injector;
   a cooling body for the injector;
   a flange of an exhaust pipe, and
   a sleeve element for the injector,
   wherein the cooling body is a passive cooling body which cools the injector only by passive cooling without using liquid cooling fluid,
   wherein the sleeve element has an elongated, thin-walled connecting section constituting a heat flow throttle,
   wherein the thin-walled connecting section has a length to thickness ratio greater than 3, and
   wherein the sleeve element has opposing axial ends, one axial end being at least indirectly connected to the flange of the exhaust pipe and the other axial end being at least indirectly connected to the support structure for the injector.

2. The SCR injection unit as recited in claim 1, wherein thermal insulation is situated between the cooling body and the connecting section.

3. The SCR injection unit as recited in claim 1, wherein the sleeve element is a formed part manufactured out of metal.

4. The SCR injection unit as recited in claim 1, wherein the length to thickness ratio of the connecting section is greater than 10, preferably greater than 20.

5. The SCR injection unit as recited in claim 1, wherein the sleeve element, in a region oriented toward the flange of the exhaust pipe, includes a shield section extending radially inward toward a tip of the injector, the shield section having a free edge and a narrow gap is provided between the free edge of the shield section and the injector.

6. The SCR injection unit as recited in claim 5, wherein an axially extending collar is formed onto the shield section and transitions into a counterpart flange to the flange of the exhaust pipe.

7. The SCR injection unit as recited in claim 6, wherein the connecting section is formed onto the shield section in the region of the collar.

8. The SCR injection unit as recited in claim 5, wherein the sleeve element includes a first region extending radially outward from the shield section, a second region adjoining the first region and extending axially away from the exhaust pipe, and a radially extending third region adjoining the second region.

9. The SCR injection unit as recited in claim 8, wherein at least some regions of the first region are embodied in the form of a counterpart flange to the flange of the exhaust pipe.

10. The SCR injection unit as recited in claim 8, wherein the cooling body is formed onto the sleeve element in its third region.

11. The SCR injection unit as recited in claim 8, wherein the support structure has a wall section situated within the sleeve element which extends parallel to and is spaced apart from the first and second regions of the sleeve element, the space between the support structure and the sleeve element constituting a thermal insulating gap which reduces heat exchange between the support structure and the sleeve element.

12. The SCR injection unit as recited in claim 1, wherein a heat-conducting body is supported in a press fit between the cooling body and the injector in a region of a tip of the injector.

13. The SCR injection unit as recited in claim 1, wherein the support structure for the injector includes a wall section, parts of which extend approximately parallel to, spaced apart from, and radially inside the connecting section, which wall section is at least indirectly attached to the axial end of the sleeve element remote from the flange of the exhaust pipe.

14. The SCR injection unit as recited in claim 1, wherein the connecting section and the support structure are indirectly connected via thermal insulation.

15. The SCR injection unit as recited in claim 1, wherein a heat-conducting body is supported in a press fit between the support structure and the injector.

16. The SCR injection unit as recited in claim 15, wherein the heat-conducting body has a direct thermal connection to the cooling body.

17. The SCR injection unit as recited in claim 1, wherein the support structure has a direct thermal connection to the cooling body.

18. The SCR injection unit as recited in claim 1, wherein the sleeve element has a circumferential shoulder protruding radially outward in a region adjacent to the flange of the exhaust pipe and is embraced by at least one V-bracket which fastens the sleeve element to the flange of the exhaust pipe in an installed position.

19. The SCR injection unit as recited in claim 18, wherein an insulation element is supported between the shoulder or the at least one V-bracket and the support structure.

20. The SCR injection unit as recited in claim 1, wherein a thermal insulation element is situated between the flange of the exhaust pipe and the sleeve element.

21. The SCR injection unit as recited in claim 1, wherein at least one region of the connecting section constitutes a heat exchanger with the ambient air.

* * * * *

UNITED STATES PATENT AND TRADEMARK OFFICE
CERTIFICATE OF CORRECTION

PATENT NO.       : 8,622,316 B2                                                      Page 1 of 1
APPLICATION NO.  : 12/521351
DATED            : January 7, 2014
INVENTOR(S)      : Haeberer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 800 days.

Signed and Sealed this
Twenty-second Day of September, 2015

Michelle K. Lee
*Director of the United States Patent and Trademark Office*